US011885975B2

(12) United States Patent
Arntsen et al.

(10) Patent No.: US 11,885,975 B2
(45) Date of Patent: Jan. 30, 2024

(54) OPTICAL SWITCH FOR SINGLE AND MULTIPLE PROJECTORS

(71) Applicant: Dolby Laboratories Licensing Corporation, San Francisco, CA (US)

(72) Inventors: John Frederick Arntsen, Manchester-by-the-Sea, MA (US); Barret Lippey, Foster City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 108 days.

(21) Appl. No.: 17/608,563

(22) PCT Filed: May 8, 2020

(86) PCT No.: PCT/US2020/032248
§ 371 (c)(1),
(2) Date: Nov. 3, 2021

(87) PCT Pub. No.: WO2020/227693
PCT Pub. Date: Nov. 12, 2020

(65) Prior Publication Data
US 2022/0244553 A1     Aug. 4, 2022

Related U.S. Application Data

(60) Provisional application No. 62/847,172, filed on May 13, 2019, provisional application No. 62/845,263, filed on May 8, 2019.

(51) Int. Cl.
*G03B 21/20*     (2006.01)
*H04N 13/356*     (2018.01)
*G02B 27/10*     (2006.01)
*G02B 26/08*     (2006.01)
*G02B 27/14*     (2006.01)
(Continued)

(52) U.S. Cl.
CPC ..... *G02B 27/1006* (2013.01); *G02B 26/0816* (2013.01); *G02B 27/14* (2013.01); *G03B 21/2013* (2013.01); *G02B 5/26* (2013.01); *G02B 30/23* (2020.01)

(58) Field of Classification Search
CPC .. H04N 13/356; H04N 13/359; H04N 13/334; G02B 27/1006; G02B 30/23; G03B 21/2013; G03B 35/22
See application file for complete search history.

(56) References Cited

U.S. PATENT DOCUMENTS 7,926,951 B2    4/2011    Bietry
9,423,682 B2    8/2016    Refai
(Continued)

FOREIGN PATENT DOCUMENTS

WO     2018064374 A1     4/2018

*Primary Examiner* — Ryan D Howard

(57) ABSTRACT

A projection system and method therefor comprises a first light source configured to emit a first-eye light, wherein the first-eye light includes a first set of wavelengths; a second light source configured to emit a second-eye light, wherein the second-eye light includes a second set of wavelengths; a first projector including first projection optics configured to receive a first input light; and an optical switch configured to be switched between an a first mode and a second mode, wherein the optical switch is configured to, in the first mode, combine the first-eye light and the second-eye light into a combined light and direct the combined light to the first projection optics as the first input light.

18 Claims, 10 Drawing Sheets

(51) Int. Cl.
  *G02B 30/23*  (2020.01)
  *G02B 5/26*  (2006.01)

(56) References Cited

U.S. PATENT DOCUMENTS

| | | |
|---|---|---|
| 9,829,612 B1 | 11/2017 | Koudsi |
| 9,829,778 B2 | 11/2017 | Raring |
| 9,946,076 B2 | 4/2018 | Smits |
| 10,025,174 B1 | 7/2018 | Tait |
| 2008/0278574 A1 | 11/2008 | Ramstad |
| 2010/0253769 A1 | 10/2010 | Coppeta |
| 2011/0128503 A1 | 6/2011 | Sawai |
| 2013/0182322 A1 | 7/2013 | Silverstein |
| 2013/0258290 A1 | 10/2013 | Plut |
| 2014/0098351 A1 | 4/2014 | Read |
| 2016/0227199 A1 | 8/2016 | Gocke |
| 2017/0374326 A1 | 12/2017 | Aikoh |
| 2018/0192013 A1 | 7/2018 | Kato |

OPTICAL SWITCH FOR SINGLE AND MULTIPLE PROJECTORS

BACKGROUND

1. Field of the Disclosure

This application relates generally to image projection systems and methods.

2. Description of Related Art

Digital projection systems typically utilize a light source and an optical system to project an image onto a surface or screen. The optical system may include components such as mirrors, lenses, waveguides, optical fibers, beam splitters, beam combiners, diffusers, spatial light modulators (SLMs), and the like.

Some projection systems are capable of three-dimensional (3D) projection; that is, projecting an image onto a screen that can be perceived by a viewer in three dimensions. 3D systems may be designed for use with dual laser projectors using techniques including spectral separation. In a spectral separation system, the projector emits light to provide six primary colors ("primaries") and the left-eye and right-eye images are separated through spectral filtering. This may be accomplished by providing the viewer with 3D glasses which include a triple band filter for each eye, such that each eye sees a different RGB spectrum. 3D systems may also be capable of two-dimensional (2D) projection in some modes; that is, projecting an image onto a screen that is perceived by a viewer in two dimensions.

When using a 3D projection system to project 2D images, comparative examples utilize the dual projectors of the 3D projection system in either a stacked or side-by-side arrangement with some minimum distance between the projectors, and their projected images are overlaid at the screen. However, because there exists a minimum distance between the dual projectors of the comparative example systems and there are manufacturing variations between the optical components of the two projectors, such systems may suffer from image differences which prevent perfectly overlaying the two images.

BRIEF SUMMARY OF THE DISCLOSURE

Various aspects of the present disclosure relate to projection systems and methods that may be optically switched between 3D projection and 2D projection modes and, when in the 2D projection modes, do not exhibit keystone artifacts.

In one exemplary aspect of the present disclosure, there is provided a projection system comprising: a first light source configured to emit a first-eye light, wherein the first-eye light includes a first set of wavelengths; a second light source configured to emit a second-eye light, wherein the second-eye light includes a second set of wavelengths; a first projector including first projection optics configured to receive a first input light; and an optical switch configured to be switched between an a first mode and a second mode, wherein the optical switch is configured to, in the first mode, combine the first-eye light and the second-eye light into a combined light and direct the combined light to the first projection optics as the first input light.

In another exemplary aspect of the present disclosure, there is provided a method of image projection comprising: emitting a first-eye light by a first light source, wherein the first-eye light includes a first set of wavelengths; emitting a second-eye light by a second light source, wherein the second-eye light includes a second set of wavelengths; receiving a first input light by a first projector including first projection optics; and switching an optical switch between an a first mode and a second mode, wherein the optical switch is configured to, in the first mode, combine the first-eye light and the second-eye light into a combined light and direct the combined light to the first projection optics as the first input light.

In this manner, various aspects of the present disclosure provide for the projection display of light using a system that may be switched between 2D operation and 3D operation, and that does not exhibit keystone artifacts in 2D operation. Thus, various aspects of the present disclosure effect improvements in at least the technical fields of image projection, cinematography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION

Figure 1:
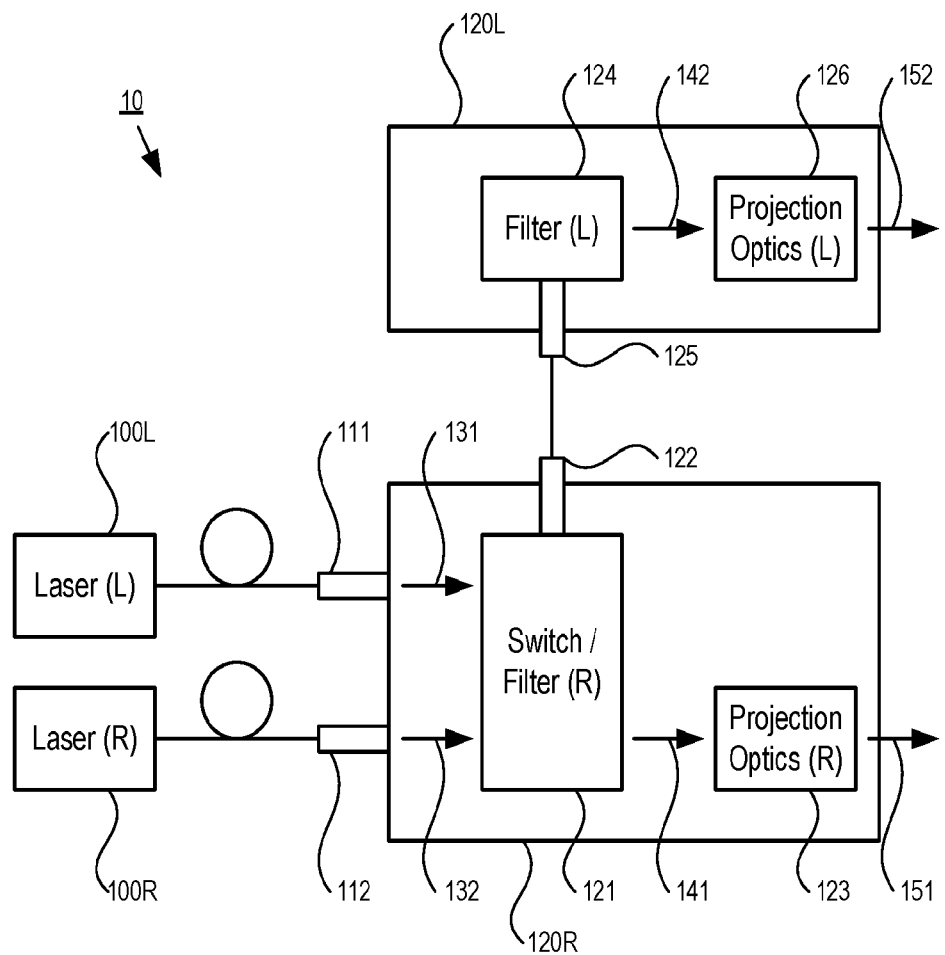
FIG. 1 illustrates a block diagram of an exemplary projection system according to various aspects of the present disclosure.

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

In the following description, numerous details are set forth, such as spectra, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various elements are used in digital projection systems, it will be understood that this is merely one example of an implementation. It will further be understood that the disclosed systems and methods can be used in any device in which there is a need to project light; for example, cinema, consumer and other commercial projection systems, optical communications, heads-up displays, virtual reality displays, and the like.

Projection Systems

In some implementations, projection systems (e.g., certain digital cinema laser projection systems) use two projectors to selectively implement both 2D and stereoscopic 3D modes of operation. For example, such a 3D projection system includes two projectors that, when operating in a 3D mode, continuously project a left-eye image and a right-eye image each including three primaries, respectively. In a 2D mode, the two projectors playback the same content and the images are overlaid at the screen, such that the resultant image includes six primaries.

As noted above, comparative examples of 3D projection systems which include a 2D mode may utilize both projectors and overlay the respective images on a screen, thereby to enhance brightness and contrast. Because there is some minimum distance between the projection lenses of the two projectors in comparative example systems (vertically where the two projectors are stacked, or horizontally where the two projectors are side-by-side), such comparative example systems exhibit mirrored keystone artifacts (i.e., portions of the projected image that do not overlap, and thus are perceived by the viewer as a "double image") in the 2D mode as a result of the distance between the two projectors. Also, even if the two projectors are matched as closely as possible, manufacturing variations in the projection lens and other optical parts may make differences between the two images that prevent an acceptable overlay.

Comparative methods to remedy these defects may be complicated and/or costly. For example, the use of pixel warping to remedy the defects requires sophisticated optical hardware and custom software solutions. Although such systems may work under particular conditions, any projector movement will result in overlay defects reappearing. Even if the warping routine is performed on a regular basis in view of potential movement, the routine may take up to 30 minutes and requires projection systems to be warmed to operating temperature to ensure no subsequent thermal drift. In any event, pixel warping is strongly objected to by many movie studios and other content creators (especially during the movie mastering and grading process) because it alters the content.

Projection systems according to various aspects of the present disclosure are described with respect to dual laser projectors implementing a spectral separation technique; however, the present disclosure may also be implemented using other light sources such as lamps. Because laser light sources are low-etendue sources, the light beams emitted therefrom can be efficiently formed into collimated beams and guided through various optical components of the projection system, such as the optical switch described in more detail below. Each laser projector may provide three of the six primaries. When operating in the 2D mode, all six primaries are projected onto the screen to create a single image that may be viewed by the viewer (e.g., an audience member in a theater) as a 2D image. When operating in the 3D mode, the sets of three primaries from each laser projector are projected onto the screen to create a left-eye image and a right-eye image, respectively, and the left-eye and right-eye images are separated through spectral filtering and separately provided to the left and right eyes of the viewer. In this manner, the viewer perceives the projected image as a 3D image.

In order to view the projected image in three dimensions, the viewer may be provided with glasses having optical filters therein. For example, the glasses may have a left optical filter disposed over the viewer's left eye and configured to pass light intended for the left eye thereto while blocking light intended for the right eye, and may have a right optical filter disposed over the viewer's right eye and configured to pass light intended for the right eye thereto while blocking light intended for the left eye. To operate thusly, the left optical filter and the right optical filter have different acceptance bands. Differences in the image presented to the viewers left and right eyes cause the projected images to appear 3D.

To eliminate the keystone artifacts or other deleterious effects that exist in comparative examples of 3D-capable projection systems in 2D operation, various aspects of the present disclosure include an optical switch that combines light from both emission sources into one projector. For 3D operation, the optical switch is configured such that the light from each emission source is respectively fed into its corresponding projector. The optical switch can either be a combiner or a splitter. Theaters that predominantly exhibit 2D content will benefit from reduced hours accumulated on the secondary projector because it will only be used for 3D operation.

Optical Switch—Combiner

For projection systems in which each set of lasers is delivered over independent fiber optics, the optical switch is a combiner. This configuration allows all light from both left- and right-eye sets of lasers to be switched into one projector in a first mode (e.g., for 2D operation), or each set of laser outputs to be switched to each projector respectively in a second mode (e.g., for 3D operation). In an exemplary digital cinema laser projection system, the two sets of lasers have different nominal primary wavelengths (e.g., R1, G1, and B1 for one laser and R2, G2, and B2 for the other laser) with a wavelength separation of about 10-30 nm between corresponding primaries. A coating on a flat optic may be designed to reflect one set of RGB wavelengths and pass the other set of RGB wavelengths. With this combiner optic positioned in the beam path, the beams can be overlapped and combined before launching into the projection system for single-projector 2D operation. With the combiner optic moved out of the beam path, each RGB set is delivered appropriately to each projector for 3D operation. The movement of the combiner optic may be manual or automated on a rotating or translating mechanism. FIG. 1 illustrates an exemplary implementation of such a system.

In particular, FIG. 1 illustrates a projection system 10 which includes a first laser light source 100L which outputs a first set of wavelengths (e.g., three primaries) corresponding to left-eye light and a second laser light source 100R which outputs a second set of wavelengths (e.g., three primaries) corresponding to right-eye light. The first laser light source 100L is, for example, a first plurality of laser emitters (e.g., fiber lasers, laser diodes, or combinations thereof) which output light via an optical fiber which terminates in a first optical coupler 111. Alternatively, each (or subsets) of the primaries corresponding to the left-eye light may be output via a separate optical fiber which terminates in the first optical coupler 111, or in a plurality of first optical couplers 111. The second laser light source 100R is, for example, a second plurality of laser emitters (e.g., fiber lasers, laser diodes, or combinations thereof) which output light via a separate optical fiber which terminates in a second optical coupler 112. Alternatively, each (or subsets) of the primaries corresponding to the right-eye light may be output via a separate optical fiber which terminates in the second optical coupler 112, or in a plurality of second optical couplers 112. The first laser light source 100L and the second laser light source 100R may be disposed in independent cabinets or may be consolidated into one cabinet. The projection system 10 includes a first projector 120L which, in a 3D mode of the projection system, projects a left-eye image. The projection system 10 further includes a second projector 120R. In the 3D mode, the second projector 120R projects a right-eye image. In a 2D mode, the second projector 120R projects all six primaries as a single image.

Both the first optical coupler 111 and the second optical coupler 112 are optically connected to the second projector 120R. Light from the first optical coupler 111 and the second optical coupler 112 respectively follow a first optical path 131 and a second optical path 132 to a first optical system 121, which selectively operates as an optical switch and right-eye filter. Depending on the state of the optical switch, the first optical system 121 may direct a portion of the received light to a third optical coupler 122 for further optical processing as will be described in more detail below. Moreover, depending on the state of the optical switch, the first optical system 121 may direct all or a portion of the received light via a third optical path 141 to first projection optics 123. The first projection optics 123 project an image via a first output optical path 151.

When the state of the optical switch is such that a portion of the received light is directed to the third optical coupler 122, the light is transported via an optical fiber to a fourth optical coupler 125 associated with the second projector 120L. The optical fiber may be a single fiber or a multi-fiber bundle. The second projector 120L includes a second optical system 124, which operates as a left-eye filter. Light from the second optical system 124 is directed via a fourth optical path 142 to second projection optics 126. The second projection optics 126 project an image via a second output optical path 152. The first projection optics 123 and the second projection optics 126 include optical components such as light homogenizers (e.g., integrating rods, fly's-eye optical components, and combinations thereof), lenses (e.g., Fourier transform lenses, zoom lens arrays, projection lenses, and combinations thereof), mirrors, SLMs (e.g., digital micromirror devices (DMDs)), and so on.

When the projection system 10 is in a 2D mode, the optical switch of the first optical system 121 is configured to direct all six primaries to the first projection optics 123. Thus, the image output via the first output optical path 151 corresponds to a six-primary 2D image. When the projection system 10 is in a 3D mode, the optical switch of the first optical system 121 is configured to direct the three primaries emitted by the first laser light source 100L to the second projection optics 126 and to direct the three primaries emitted by the second laser light source 100R to the first projection optics 123. Thus, the image output via the second output optical path 152 corresponds to a three-primary left-eye image and the image output via the first output optical path 151 corresponds to a three-primary right-eye image.

Figure 2A:
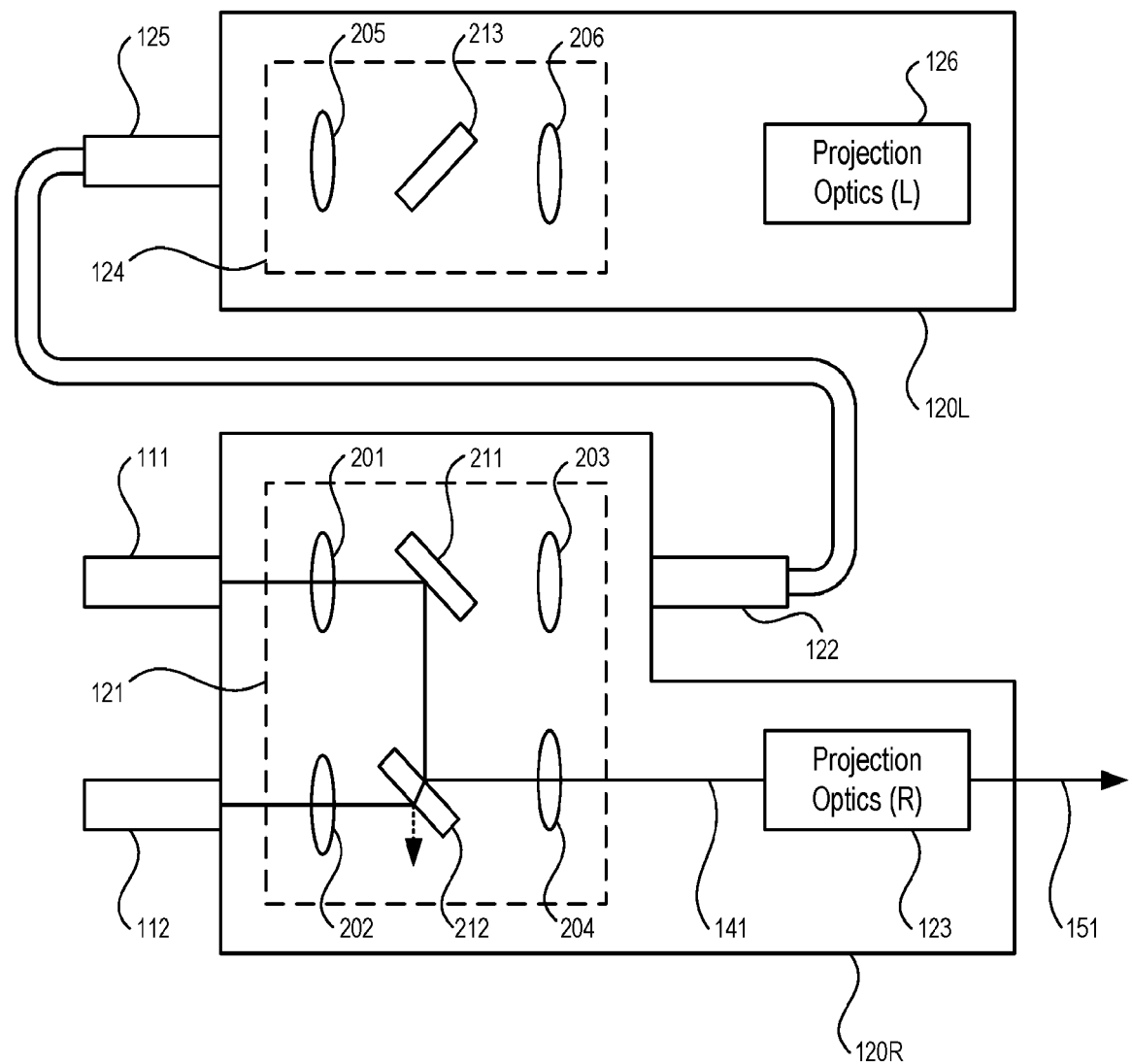
FIGS. 2A-2B illustrate exemplary projector details for the projection system according to FIG. 1.
Figure 2B:
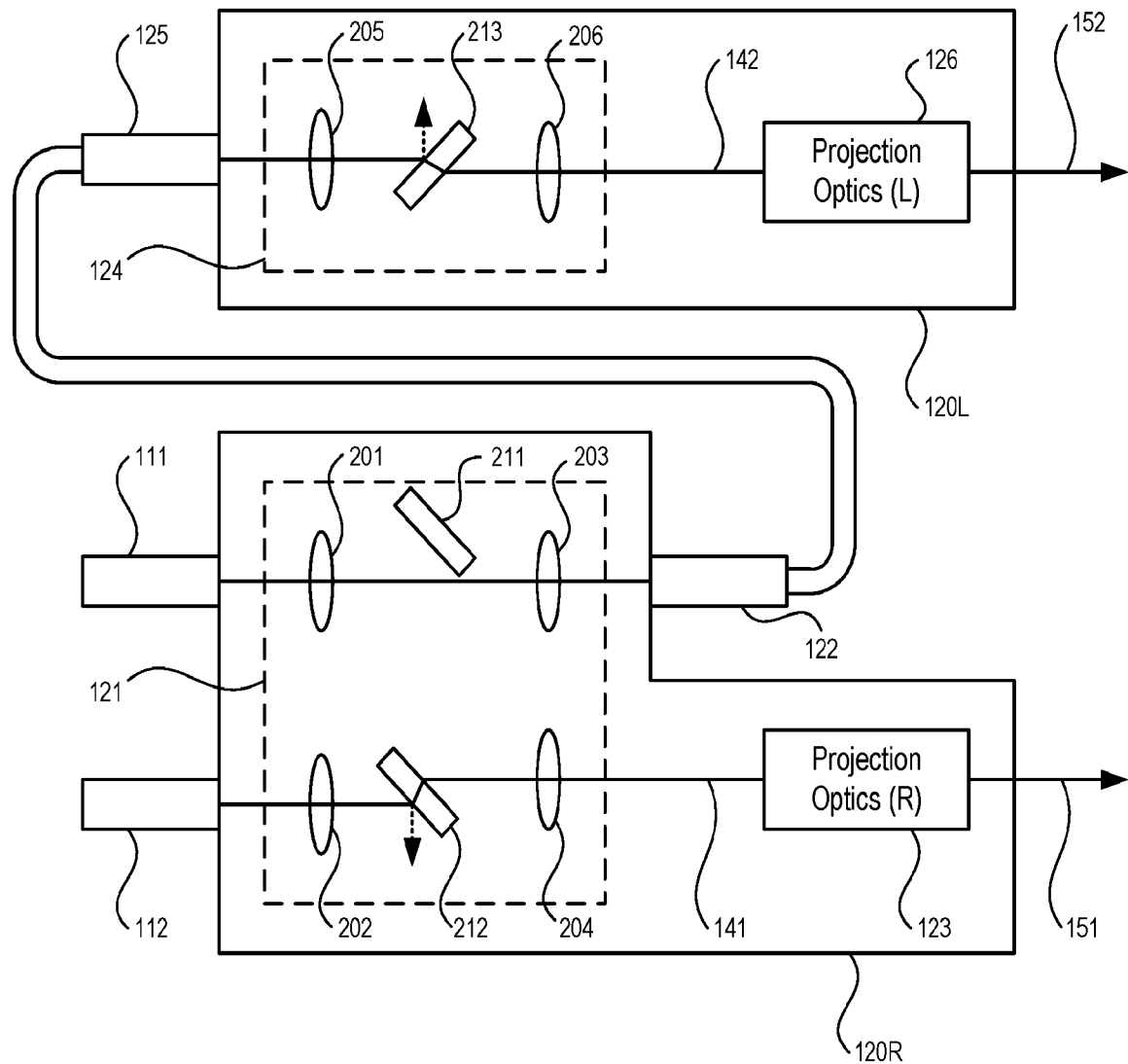

FIGS. 2A-2B illustrate the modes of the projection system 10 in greater detail. In particular, FIG. 2A illustrates a part of the projection system 10 in the 2D mode, and FIG. 2B illustrates the part of the projection system 10 in the 3D mode. As illustrated in FIGS. 2A-2B, the first optical system 121 includes a first lens 201, a second lens 202, a third lens 203, a fourth lens 204, a movable mirror 211 (or other reflective element), and a first filter 212. The second optical system 124 includes a fifth lens 205, a second filter 213, and a sixth lens 206. In some examples, the first filter 212 and the second filter 213 are trim filters that reflect unwanted tails of the emission peaks. The movable mirror 211 is movable between a position in the beam path and a position out of the beam path. The movement of the movable mirror 211 may be manual or automated on a rotating or translating mechanism.

When the projection system 10 is in the 2D mode illustrated in FIG. 2A, the movable mirror 211 is located in an optical path of light received via the first optical coupler 111 through the first lens 201. In this mode, the movable mirror 211 reflects the light from the first optical coupler 111 toward the first filter 212. The first filter 212 acts both as a combiner and as a trim filter. The first filter 212 is located in an optical path of light received via the second optical coupler 112 through the second lens 202 and reflects a portion of the light corresponding to unwanted light (e.g., unwanted tails of the emission bands) from the second laser light source 100R while transmitting a portion of the light corresponding to the desired light from the second laser light source 100R. While the first filter 212 is illustrated as a relatively-thick element, in practice the first filter 212 (and/or other filters illustrated and described herein) may be sufficiently thin that the transmitted and reflected beams are substantially overlapping, thereby to improve uniformity. The first filter 212 is also located in an optical path of light reflected by the movable mirror 211 in the 2D mode, such that the transmitted right-eye light and the doubly-reflected left-eye light travel along the same (or substantially the same) optical path through the fourth lens 204 and to the first projection optics 123. As illustrated, this optical path corresponds to the third optical path 141 of FIG. 1. Thus, in the 2D mode, the first projection optics 123 output an image along the first output optical path 151 which corresponds to a six-primary 2D image exhibiting reduced or no overlay artifacts.

When the projection system 10 is in the 3D mode illustrated in FIG. 2B, the movable mirror 211 is located outside of the optical path of light received via the first optical coupler 111 through the first lens 201. Thus, the light from the first optical coupler 111 proceeds through the third lens 203 and into the third optical coupler 122, where it is transported via an optical fiber to the fourth optical coupler 125 associated with the second projector 120L. The light from the second optical coupler 112 passes through the second lens 202 to the first filter 212, where the portion of the light corresponding to unwanted light (e.g., unwanted tails of the emission bands) from the second laser light source 100R is reflected and the portion of the light corresponding to the desired light from the second laser light source 100R is transmitted through the fourth lens 204 and to the first projection optics 123.

In the second projector 120L, the light input by the fourth optical coupler 125 passes through the fifth lens 205 to the second filter 213. The second filter 213 is a trim filter that reflects a portion of the light corresponding to unwanted tails of the emission bands from the first laser light source 100L while transmitting a portion of the light corresponding to the desired peaks from the first laser light source 100L. The transmitted portion passes through the sixth lens 206 and travels along an optical path (as illustrated, corresponding to the fourth optical path 142 of FIG. 1) to the second projection optics 126. Thus, in the 3D mode the first projection optics 123 output an image along the first output optical path 151 which corresponds to a three-primary right-eye image and the second projection optics 126 output an image along the second output optical path 152 which corresponds to a three-primary left-eye image.

The combiner configuration of the optical switch allows left and right trim filters (i.e., the first filter 212 and the second filter 213) to be present in both 2D and 3D operation. In 2D operation, this ensures defined spectra to meet color gamut specifications, even with lasers that may contain emission that is out of band. In 3D operation, this eliminates unwanted spectral bands from each projector respectively, and thereby reduces crosstalk between the eyes.

While FIGS. 2A-2B illustrate the optical switch as combining the left-eye and right-eye light by reflecting the left-eye light and combining it with the right-eye light in the 2D mode, the present disclosure is not so limited. In some implementations, the movable mirror 211 and the first filter 212 may be reversed, and appropriate adjustments may be made to the angle and axial position of the remaining optical components, so that the optical switch reflects the right-eye light and combines it with the left-eye light in the 2D mode. By locating the combiner inside the projector 120R, there is no need to relaunch light from the combiner into a fiber patch cable. However, while FIGS. 2A-2B illustrate the combiner as being internal to the second projector 120R, the present disclosure is not so limited. In some implementations, the combiner may be externally located with fiber patch cables to each projector. The fiber patch cables between an external switch and the projectors may be selected to accommodate different distances between the switch and projectors, thereby allowing the distance from the lasers to the external shift to be made a standard length.

Moreover, while FIGS. 1-2B illustrate the first projector 120L and the second projector 120R using separate blocks, the present disclosure is not limited to implementations where the first projector 120L and the second projector 120R are confined to separate cabinets or casings. In some implementations, the first projector 120L and the second projector 120R may be included in a single projector cabinet from which the first projection optics 123 and (in the 3D mode) the second projection optics 126 output their respective images, the fiber patch cable between the third optical coupler 122 and the fourth optical coupler 125 (as well as the couplers themselves) may be eliminated.

Optical Switch—Splitter

Figure 3:
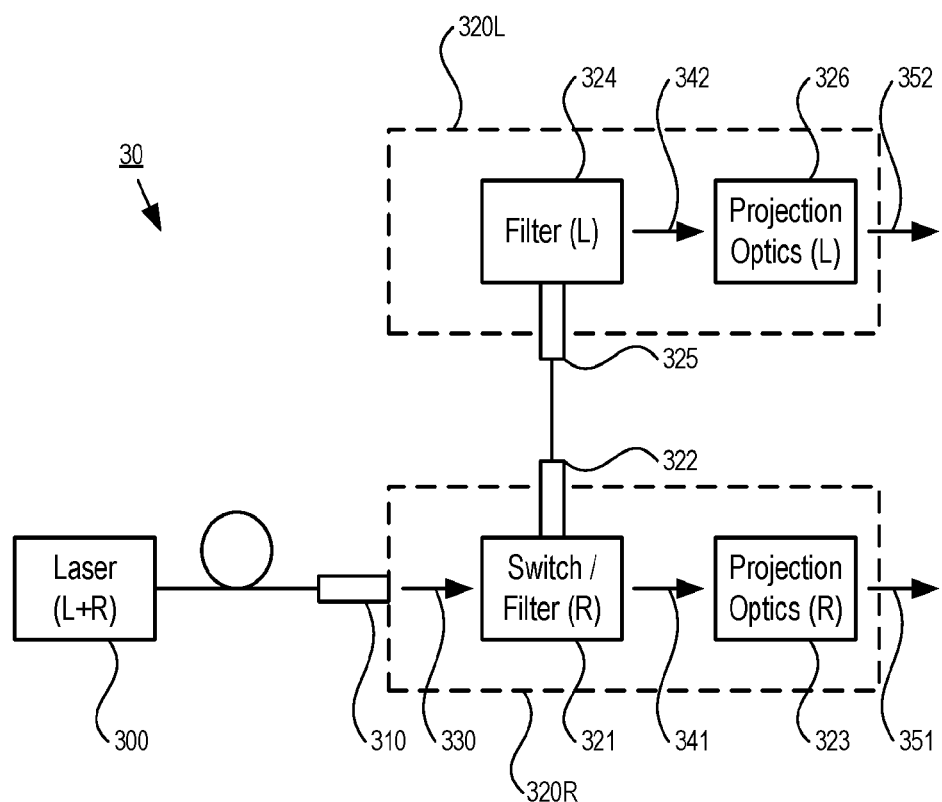
FIG. 3 illustrates a block diagram of another exemplary projection system according to various aspects of the present disclosure.

For projection systems in which both sets of lasers are delivered over a single fiber optic, the optical switch may be a splitter. This configuration allows all light from both left- and right-eye sets of lasers to be switched into one projector in a first mode (e.g., for 2D operation), or each set of laser outputs to be switched to each projector respectively in a second mode (e.g., for 3D operation). As noted above, in an exemplary digital cinema laser projection system, the two sets of lasers have different nominal primary wavelengths (e.g., R1, G1, and B1 for one laser and R2, G2, and B2 for the other laser) with a wavelength separation of about 10-30 nm between corresponding primaries. A coating on a flat optic may be designed to reflect one set of RGB wavelengths and pass the other set of RGB wavelengths. With this splitter optic positioned in the beam path, one set of wavelengths is passed to one projector and the other set of wavelengths is reflected to the other projector for two-projector 3D operation. With the splitter optic moved out of the beam path, both sets of RGB wavelengths are delivered to one projector for single-projector 2D operation. The movement of the splitter optic may be manual or automated on a rotating or translating mechanism. FIG. 3 illustrates an exemplary implementation of such a system.

In particular, FIG. 3 illustrates a projection system 30 which includes a laser light source 300 which outputs a combined set of wavelengths (e.g., six primaries) corresponding to both a first subset of wavelengths for left-eye light and a second subset of wavelengths for right-eye light. The laser light source 300 is, for example, a plurality of laser emitters (e.g., fiber lasers, laser diodes, or combinations thereof) which output light via an optical fiber which terminates in a first optical coupler 310. Alternatively, each (or subsets) of the six primaries may be output via a separate optical fiber which terminates in the first optical coupler 310, or in a plurality of first optical couplers 310. The projection system 50 includes a first projector 320L which, in a 3D mode of the projection system, projects a left-eye image. The projection system 30 further includes a second projector 320R. In the 3D mode, the second projector 320R projects a right-eye image. In a 2D mode, the second projector 320R projects all six primaries a single image.

The optical coupler 310 is optically connected to the second projector 320R. Light from the optical coupler 310 follows a first optical path 330 to a first optical system 321, which selectively operates both as an optical switch and as a right-eye filter. Depending on the state of the optical switch, the first optical system 321 may direct a portion of the received light to a second optical coupler 322 for further optical processing as will be described in more detail below. Moreover, depending on the state of the optical switch, the first optical system 321 may direct all or a portion of the received light via a second optical path 341 to first projection optics 323. The first projection optics 323 project an image via a first output optical path 351.

When the state of the optical switch is such that a portion of the received light is directed to the second optical coupler 322, the light is transported via an optical fiber to a third optical coupler 325 associated with the second projector 320L. The optical fiber may be a single fiber or a multi-fiber bundle. The second projector 320L includes a second optical system 324, which operates as a left-eye filter. Light from the second optical system 324 is directed via a third optical path 342 to second projection optics 326. The second projection optics 326 project an image via a second output optical path 352. The first projection optics 323 and the second projection optics 326 include optical components such as light homogenizers (e.g., integrating rods, fly's-eye optical components, and combinations thereof), lenses (e.g., zoom lens arrays, projection lenses, and combinations thereof), mirrors, SLMs (e.g., DMDs), and so on.

When the projection system 30 is in a 2D mode, the optical switch of the first optical system 321 is configured to direct all six primaries to the first projection optics 323. Thus, the image output via the first output optical path 351 corresponds to a six-primary 2D image. When the projection system 30 is in a 3D mode, the optical switch of the first optical system 321 is configured to direct the three primaries corresponding to the left-eye image emitted by the laser light source 300 to the second projection optics 326 and to direct the three primaries corresponding to the right-eye image emitted by the laser light source 300 to the first projection optics 323. Thus, the image output via the second output optical path 352 corresponds to a three-primary left-eye image and the image output via the first output optical path 351 corresponds to a three-primary right-eye image.

Figure 4A:
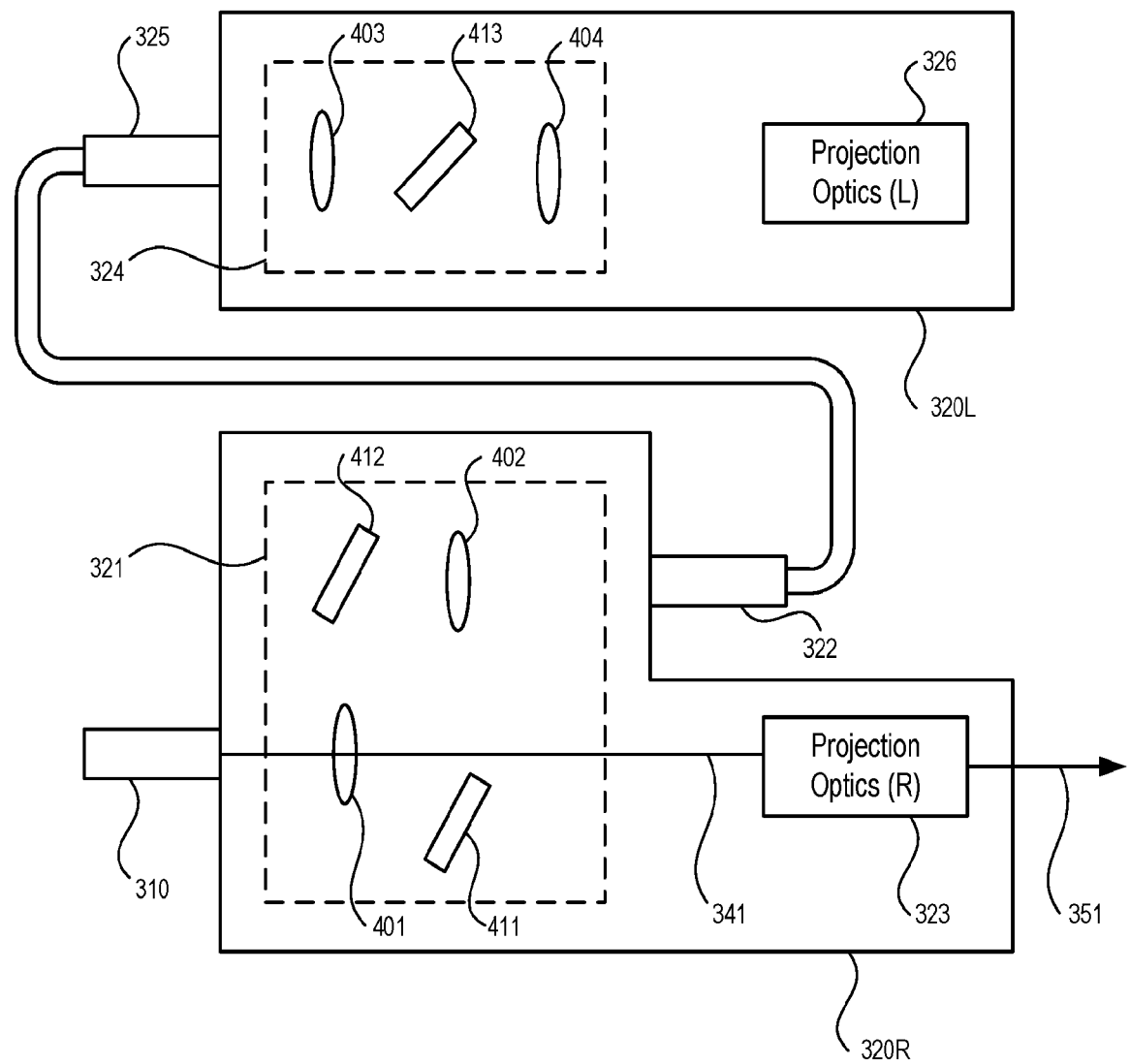
FIGS. 4A-4B illustrate exemplary projector details for the projection system according to FIG. 3.
Figure 4B:
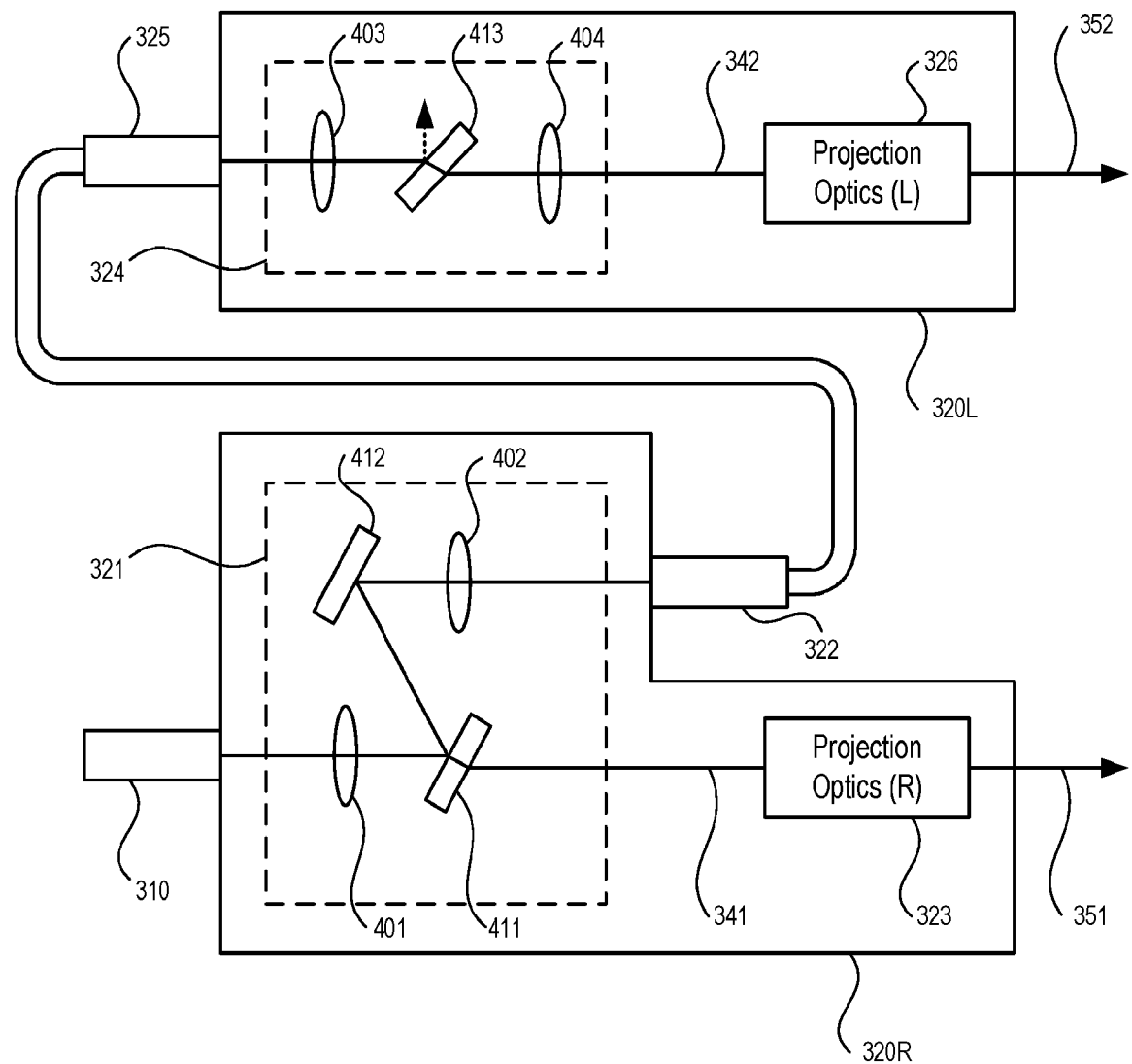

FIGS. 4A-4B illustrate the modes of the projection system 30 in greater detail. In particular, FIG. 4A illustrates a part of the projection system 30 in the 2D mode, and FIG. 4B illustrates the part of the projection system 30 in the 3D mode. As illustrated in FIGS. 4A-4B, the first optical system 321 includes a first lens 401, a second lens 402, a movable first filter 411, and a mirror 412 (or other reflective element). The second optical system 324 includes a third lens 403, a second filter 413, and a fourth lens 404. In some examples, the first filter 411 and the second filter 413 are trim filters that reflect unwanted tails of the emission peaks. The first filter 411 is movable between a position in the beam path and a position out of the beam path. The movement of the first filter 411 may be manual or automated on a rotating or translating mechanism.

When the projection system 30 is in the 2D mode illustrated in FIG. 4A, the first filter 411 is located outside of the optical path of light received via the first optical coupler 310 through the first lens 401. Thus, all (or substantially all) of the light from the first optical coupler 310 proceeds along the second optical path 341 and to the first projection optics 423. Thus, in the 2D mode, the first projection optics 423 output an image along the first output optical path 351 which corresponds to a six-primary 2D image exhibiting reduced or no overlay artifacts.

When the projection system 30 is in the 3D mode illustrated in FIG. 4B, the first filter 411 is located in the optical path of light received via the optical coupler 310 through the first lens 401. The first filter 411 acts as a splitter and as a trim filter. The first filter reflects a portion of the light corresponding to the left-eye image emitted by the laser light source 300 and a portion of the light corresponding to unwanted tails of the emission bands for the right-eye image emitted by the laser light source 300, while transmitting a portion of the light corresponding to the desired peaks of the right-eye image from the laser light source 300. In the particular example illustrated in FIG. 4B, the mirror 412 is located in an optical path of the reflected portion of light, and reflects the incident light through the second lens 402 to the second optical coupler 322, where it is transported via an optical fiber to the third optical coupler 325 associated with the second projector 320L. In other examples, the mirror 412 may be omitted, in which case the second optical coupler 322 may be repositioned such that it lies in the optical path of the reflected portion of light.

In the second projector 320L, the light input by the third optical coupler 325 passes through the third lens 403 to the second filter 413. The second filter 413 is a trim filter that reflects a portion of the light corresponding to unwanted light of both the left-eye and right-eye emission bands from the laser light source 300 while transmitting a portion of the light corresponding to the desired peaks of the left-eye image from the laser light source 300. The transmitted portion passes through the fourth lens 404 and travels along an optical path (as illustrated, corresponding to the fourth optical path 342 of FIG. 3) to the second projection optics 326. Thus, in the 3D mode the first projection optics 323 output an image along the first output optical path 351 which corresponds to a three-primary right-eye image and the second projection optics 326 output an image along the second output optical path 352 which corresponds to a three-primary left-eye image.

In the particular illustration of FIGS. 4A-4B, refraction of light transmitted through the first filter 411 may cause the optical axis of the second optical path 341 to shift laterally. In the event that such a shift negatively affects the performance of the first projection optics 323, one or more optical elements such as an electronic crystal may be disposed between the first filter 411 and the first projection optics 323 to provide an equal and opposite lateral shift to the optical axis of the second optical path 341. Where such optical elements are used, they may be configured to move along with the first filter 411 so that they do not affect light in the 2D mode.

While FIGS. 4A-4B illustrate the optical switch as splitting the left-eye and right-eye light such that the left-eye light is sent to a separate projector in the 3D mode, the present disclosure is not so limited. In some implementations, the filtering and reflection wavelengths of the first filter 411 may be appropriately chosen such that the right-eye light is sent to a separate projector in the 3D mode. By locating the splitter inside the projector 120R, there is no need to relaunch light from the splitter into a fiber patch cable. However, while FIGS. 4A-4B illustrate the splitter as being internal to the second projector 420R, the present disclosure is not so limited. In some implementations, the splitter may be externally located with fiber patch cables to each projector. The fiber patch cables between an external switch and the projectors may be selected to accommodate different distances between the switch and projectors, thereby allowing the distance from the lasers to the external shift to be made a standard length.

Moreover, while FIGS. 3-4B illustrate the first projector 320L and the second projector 320R using separate blocks, the present disclosure is not limited to implementations where the first projector 320L and the second projector 320R are confined to separate cabinets or casings. In some implementations, the first projector 320L and the second projector 320R may be included in a single projector cabinet from which the first projection optics 323 and (in the 3D mode) the second projection optics 326 output their respective images, the fiber patch cable between the third optical coupler 322 and the fourth optical coupler 325 (as well as the couplers themselves) may be eliminated.

Optical Switch—Splitter/Recombiner

For projection systems in which both sets of lasers are delivered over a single fiber optic, the optical switch may alternatively be a splitter/recombiner. This configuration similarly allows all light from both left- and right-eye sets of lasers to be switched into one projector in a first mode (e.g., for 2D operation), or each set of laser outputs to be switched to each projector respectively in a second mode (e.g., for 3D operation); however, this configuration may result in a reduced or eliminated launch offset (lateral shift) as compared to the splitter configuration discussed above. Moreover, this configuration may result in eased manufacturing tolerances and/or reduced precision requirements for the positioning of various components.

Figure 5:
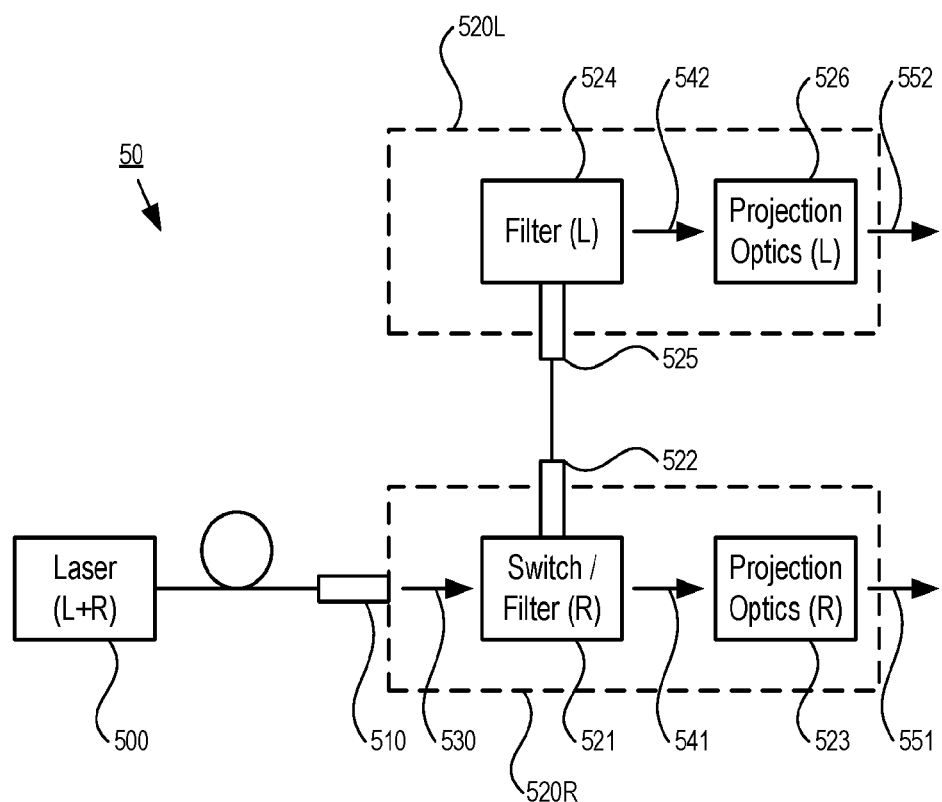
FIG. 5 illustrates a block diagram of another exemplary projection system according to various aspects of the present disclosure.

As noted above, in an exemplary digital cinema laser projection system, the two sets of lasers have different nominal primary wavelengths (e.g., R1, G1, and B1 for one laser and R2, G2, and B2 for the other laser) with a wavelength separation of about 10-30 nm between corresponding primaries. A coating on a flat optic may be designed to reflect one set of RGB wavelengths and pass the other set of RGB wavelengths. With a recombiner portion of the splitter/recombiner optic positioned in the beam path, one set of wavelengths is passed to one projector and the other set of wavelengths is reflected to the other projector for two-projector 3D operation. With the recombiner portion of the splitter/recombiner optic moved out of the beam path, both sets of RGB wavelengths are delivered to one projector for single-projector 2D operation. The movement of the recombiner portion may be manual or automated on a rotating or translating mechanism. FIG. 5 illustrates an exemplary implementation of such a system.

In particular, FIG. 5 illustrates a projection system 50 which includes a laser light source 500 which outputs a combined set of wavelengths (e.g., six primaries) corresponding to both a first subset of wavelengths for left-eye light and a second subset of wavelengths for right-eye light.

The laser light source 500 is, for example, a plurality of laser emitters (e.g., fiber lasers, laser diodes, or combinations thereof) which output light via an optical fiber which terminates in a first optical coupler 510. Alternatively, each (or subsets) of the six primaries may be output via a separate optical fiber which terminates in the first optical coupler 510, or in a plurality of first optical couplers 510. The projection system 50 includes a first projector 520L which, in a 3D mode of the projection system, projects a left-eye image. The projection system 50 further includes a second projector 520R. In the 3D mode, the second projector 520R projects a right-eye image. In a 2D mode, the second projector 520R projects all six primaries a single image.

The optical coupler 510 is optically connected to the second projector 520R. Light from the optical coupler 510 follows a first optical path 530 to a first optical system 521, which selectively operates both as an optical switch and as a right-eye filter. Depending on the state of the optical switch, the first optical system 521 may direct a portion of the received light to a second optical coupler 522 for further optical processing as will be described in more detail below. Moreover, depending on the state of the optical switch, the first optical system 521 may direct all or a portion of the received light via a second optical path 541 to first projection optics 523. The first projection optics 523 project an image via a first output optical path 551.

When the state of the optical switch is such that a portion of the received light is directed to the second optical coupler 522, the light is transported via an optical fiber to a third optical coupler 525 associated with the second projector 520L. The optical fiber may be a single fiber or a multi-fiber bundle. The second projector 520L includes a second optical system 524, which operates as a left-eye filter. Light from the second optical system 524 is directed via a third optical path 542 to second projection optics 526. The second projection optics 526 project an image via a second output optical path 552. The first projection optics 523 and the second projection optics 526 include optical components such as light homogenizers (e.g., integrating rods, fly's-eye optical components, and combinations thereof), lenses (e.g., zoom lens arrays, projection lenses, and combinations thereof), mirrors, SLMs (e.g., DMDs), and so on.

When the projection system 50 is in a 2D mode, the optical switch of the first optical system 521 is configured to direct all six primaries to the first projection optics 523. Thus, the image output via the first output optical path 551 corresponds to a six-primary 2D image. When the projection system 50 is in a 3D mode, the optical switch of the first optical system 521 is configured to direct the three primaries corresponding to the left-eye image emitted by the laser light source 500 to the second projection optics 526 and to direct the three primaries corresponding to the right-eye image emitted by the laser light source 500 to the first projection optics 523. Thus, the image output via the second output optical path 552 corresponds to a three-primary left-eye image and the image output via the first output optical path 551 corresponds to a three-primary right-eye image.

Figure 6A:
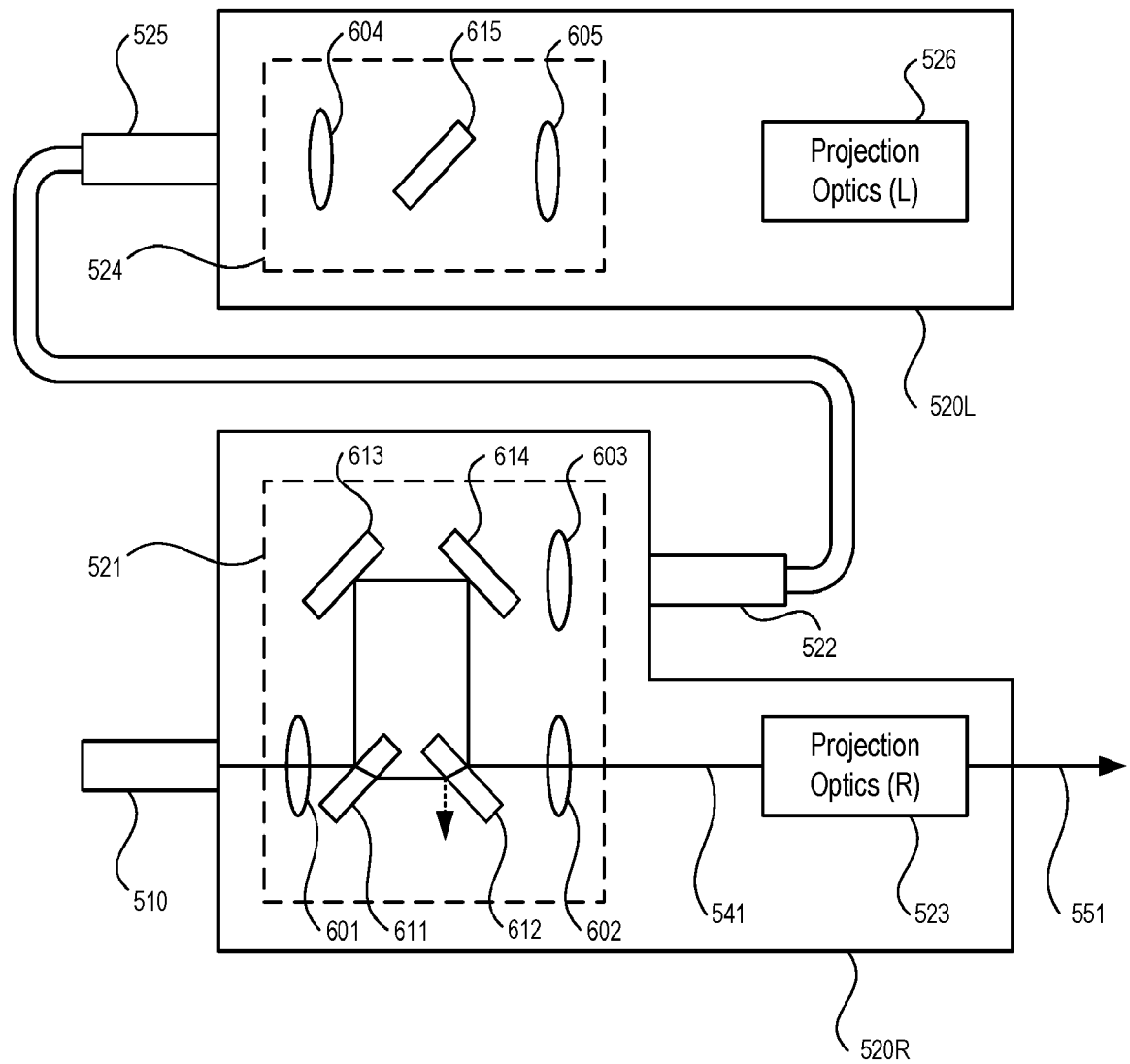
FIGS. 6A-6B illustrate exemplary projector details for the projection system according to FIG. 5.
Figure 6B:
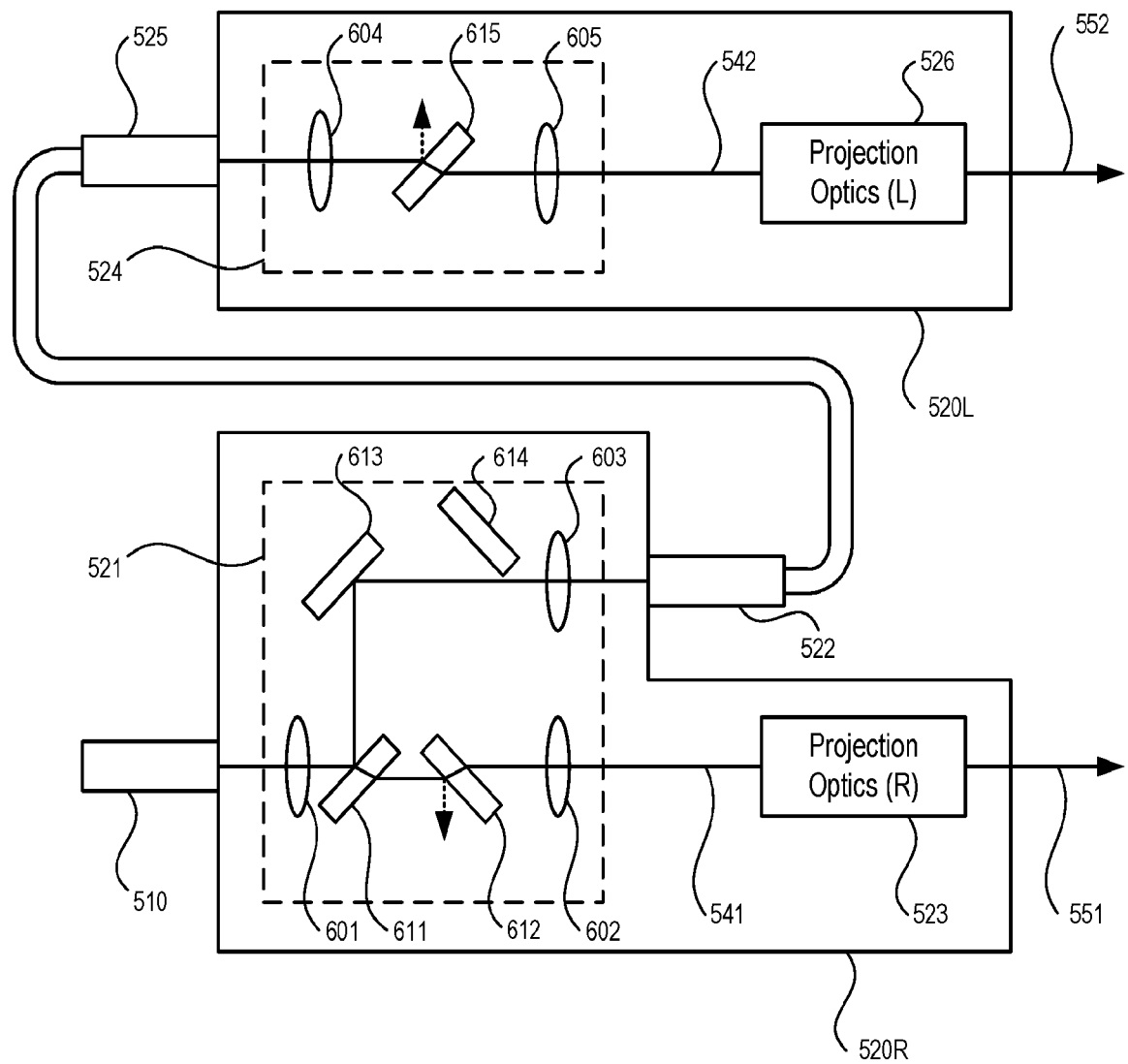

FIGS. 6A-6B illustrate the modes of the projection system 50 in greater detail. In particular, FIG. 6A illustrates a part of the projection system 50 in the 2D mode, and FIG. 6B illustrates the part of the projection system 50 in the 3D mode. As illustrated in FIGS. 6A-6B, the first optical system 521 includes a first lens 601, a second lens 602, a third lens 603, a first filter 611, a second filter 612, a stationary mirror 613 (or other reflective element), and a movable mirror 614. The second optical system 524 includes a fourth lens 604, a fifth lens 605, and a third filter 615. In some examples, the first filter 611, the second filter 612, and the third filter 615 are trim filters that reflect unwanted tails of the emission peaks. The movable mirror 614 is movable between a position in a section of the beam path and a position out of the section of the beam path. The movement of the movable mirror 614 may be manual or automated on a rotating or translating mechanism.

Light received from the first optical coupler 510 through the first lens 601 is incident on the first filter 611. The first filter 611 reflects a portion of the light corresponding to the left-eye image emitted by the laser light source 500, while transmitting a portion of the light corresponding to the desired peaks of the right-eye image from the laser light source 500 toward a first surface of the second filter 612. The second filter 612 reflects a portion of the light that has passed through the first filter 611 corresponding to unwanted tails of the emission bands for the right-eye image emitted by the laser light source 500, while transmitting a portion of the light corresponding to the desired peaks of the right-eye image from the laser light source 500.

Light reflected by the first filter 611 is incident on the stationary mirror 613. When the projection system 50 is in the 2D mode illustrated in FIG. 6A, the movable mirror 614 is located in the optical path of light reflected from the stationary mirror 613. In this mode, the movable mirror 614 reflects the light reflected from the stationary mirror 613 toward a second surface of the second filter 613 opposite the first surface. The second filter 613 reflects the light reflected from the movable mirror 614 toward the second lens 602, such that the transmitted right-eye light and the triply-reflected left-eye light travel along the same (or substantially the same optical path through the second lens 602 and to the first projection optics 523. Because these optical paths are the same (or substantially the same), the first optical system 521 corrects for lateral shift. As illustrated, this optical path corresponds to the third optical path 541 of FIG. 5. Thus, in the 2D mode, the first projection optics 523 output an image along the first output optical path 551 which corresponds to a six-primary 2D image exhibiting reduced or no overlay artifacts or lateral shift.

When the projection system 50 is in the 3D mode illustrated in FIG. 6B, the movable mirror 614 is located outside of the optical path of the light reflected by the stationary mirror 613. In this mode, the light reflected by the stationary mirror 613 proceeds through the third lens 603 and into the second optical coupler 522, where it is transported via an optical fiber to the fourth optical coupler 525 associated with the second projector 520L. In the second projector 520L, the light input by the fourth optical coupler 525 passes through the fourth lens 604 to the third filter 615. The third filter is a trim filter that reflects a portion of the light corresponding to unwanted tails of the emission bands of from the laser light source 500 while transmitting a portion of the light corresponding to the desired peaks from the laser light source 500. The transmitted portion passes through the fifth lens 605 and travels along an optical path (as illustrated, corresponding to the fourth optical path 542 of FIG. 5) to the second projection optics 526.

Meanwhile, the light transmitted through the first filter 611 (and not reflected toward the stationary mirror 613) is incident on the first surface of the second filter 612. As in the 2D mode, the second filter 612 reflects a portion of the light that has passed through the first filter 611 corresponding to unwanted tails of the emission bands for the right-eye image emitted by the laser light source 500, while transmitting a portion of the light corresponding to the desired peaks of the right-eye image from the laser light source 500 through the second lens 602 and to the first projection optics 523. Thus, in the 3D mode the first projection optics 523 outputs an image along the first output optical path 551 which corresponds to a three-primary right-eye image and the second projection optics output an image along the second output optical path 552 which corresponds to a three-primary left-eye image.

While FIG. 6B illustrates the second filter 612 as reflecting the portion of the light that has passed through the first filter 611 corresponding to unwanted tails of the emission bands for the right-eye image emitted by the laser light source 500, the present disclosure is not so limited. In other implementations, the first filter 611 reflects the unwanted tails of the emission bands for the right-eye image emitted by the laser light source 500 in addition to the portion of the light corresponding to the left-eye image emitted by the laser light source 500, such that the third filter 615 reflects a portion of the light corresponding to unwanted light of both the left-eye and right-eye emission bands from the laser light source 500 while the projection system 50 is in the 3D mode.

Furthermore, while FIGS. 6A-6B illustrate the optical switch as splitting the left-eye and right-eye light such that the left-eye light is sent to a separate projector in the 3D mode, the present disclosure is not so limited. In some implementations, the filtering and reflection wavelengths of the first filter 611 or the second filter 612 may be appropriately chosen such that the right-eye light is sent to a separate projector in the 3D mode. By locating the splitter/recombiner inside the projector 520R, there is no need to relaunch light from the splitter/recombiner into a fiber patch cable. However, while FIGS. 6A-6B illustrate the splitter/recombiner as being internal to the second projector 520R, the present disclosure is not so limited. In some implementations, the splitter/recombiner may be externally located with fiber patch cables to each projector. The fiber patch cables between an external switch and the projectors may be selected to accommodate different distances between the switch and projectors, thereby allowing the distance from the lasers to the external shift to be made a standard length.

Moreover, while FIGS. 5-6B illustrate the first projector 520L and the second projector 520R using separate blocks, the present disclosure is not limited to implementations where the first projector 520L and the second projector 520R are confined to separate cabinets or casings. In some implementations, the first projector 520L and the second projector 520R may be included in a single projector cabinet from which the first projection optics 523 and (in the 3D mode) the second projection optics 526 output their respective images, the fiber patch cable between the third optical coupler 522 and the fourth optical coupler 525 (as well as the couplers themselves) may be eliminated.

Device Implementation

Figure 7:
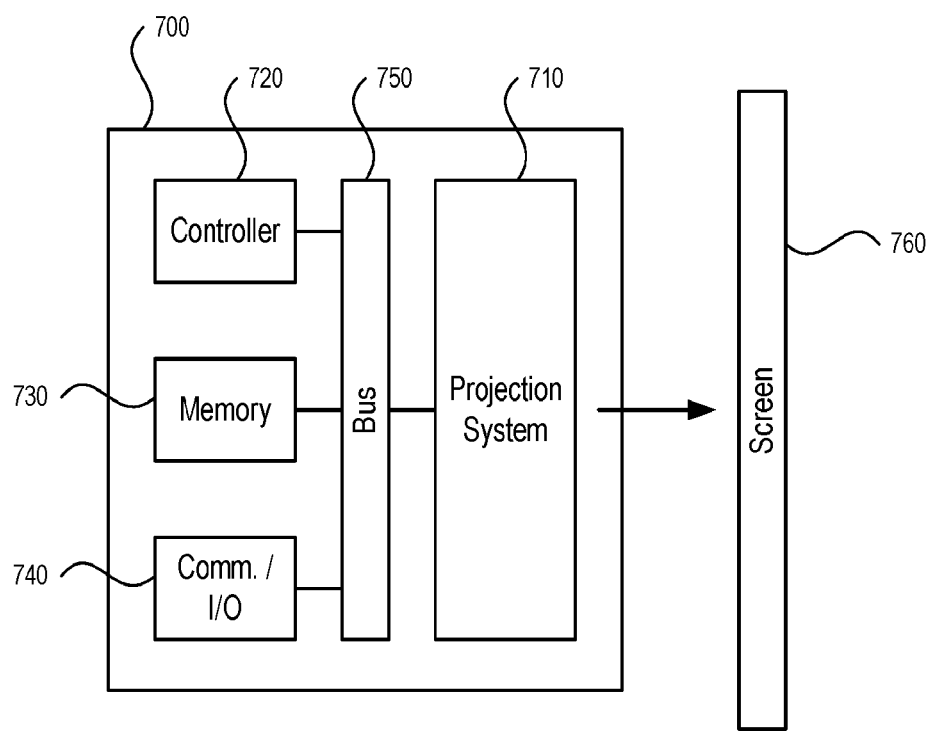
FIG. 7 illustrates an exemplary device implementing various aspects of the present disclosure.

Projection systems including the above-described optical switch may be implemented by way of an electronic device including several optical and electronic components. FIG. 7 illustrates one such device 700.

As illustrated in FIG. 7, the device 700 includes a projection system 710, a controller 720, a memory 730, and communications and I/O circuitry 740. The projection system 710, the controller 720, the memory 730, and the communications and I/O circuitry 740 communicate via a bus 750. The projection system 710 may be, for example, the projection system 10 illustrated in FIG. 1, the projection system 30 illustrated in FIG. 3, or the projection system 50 illustrated in FIG. 5. The controller 720 may be, for example, one or more processors or other control circuitry, such as a central processing unit (CPU), a graphics processing unit (GPU), a field-programmable gate array (FPGA), an application-specific integrated circuit (ASIC), and the like. The memory 730 may be, for example, a hard disk, a removable media drive, an optical or magnetic storage device, and combinations thereof. The memory 730 may include read-only memory (ROM) and/or random-access memory (RAM). The communications and I/O circuitry 740 may be, for example, a set of circuits, ports, connectors, etc., to allow the device 700 to communicate with a user or another device. The communications and I/O circuitry 740 may include wired communication interfaces and connect to user interface devices such as a mouse, a keyboard, a display, a touch screen, a wired network, and so on; additionally or alternatively, the communications and I/O circuitry 740 may include wireless communication interfaces such as Bluetooth, near-field communications (NFC), wireless local area networks (WLANs), and so on. The communications and I/O circuitry 740 may allow for the receipt of user instructions, streaming image data, device calibration, software or firmware updates, and so on.

The memory 730 may store non-transitory computer-readable media storing instructions that, when executed by the controller 720, cause the device to perform various operations. For example, the controller 720 may provide control signals to the projection system 710 (or to one or more actuators associated therewith) to cause the projection system to switch between a 2D mode (e.g., as illustrated in FIG. 2A, 4A, or 6A) and a 3D mode (e.g., as illustrated in FIG. 2B, 4B, or 6B). The controller 720 may provide control signals to the projection system 710 to control the light-emitting elements thereof to emit light in accordance with image data stored in the memory 730 and/or received via communications and I/O circuitry 740. Additionally or alternatively, the controller 720 may provide control signals to one or more SLMs associated with the projection system 710 to modify emitted light in accordance with the image data, thereby to form a projected image on a screen 760.

Moreover, while FIG. 7 illustrates a single device 700 including all of the above-noted elements, in some implementations a portion or all of the projection system 710 may be separate from the device 700 (e.g., in a separate housing in communication with the device 700). In one example, the portions of the projection system 510 associated with the emission of light (e.g., the first laser light source 100L and second laser light source 100R of FIG. 1, the laser light source 300 of FIG. 3, or the laser light source 500 of FIG. 5) are disposed in a common housing with device 700 whereas the optically-downstream components (e.g., the projectors 120L and 120R of FIG. 1, the projectors 320L and 320R of FIG. 3, or the projectors 520L and 520R of FIG. 5) are provided in a separate housing or housings in optical and/or electronic communication with the device 700. In another example, the entirety of the projection system 710 is disposed in a separate housing in optical and/or electronic communication with the device 700.

Within the projection system 710, various optical fibers may be used to direct light in one or more of the manners described above. In some examples, the dimensions of the individual optical fibers may be selected so as to reduce or eliminate path differences between various optical paths. For example, light may be transported within and/or among the projectors by various lengths of 50-800 μm fibers.

Effects and Applications

The above-described optical switch configurations, whether in a combiner implementation or a splitter implementation, results in the overlapping of the beams before launching into the projection optics. This ensures uniform illumination. The left-eye RGB wavelength set and the right-eye RGB wavelength set fiber outputs may be spatially combined, and there is no requirement that the outputs overlap before launching into the projector, although such a configuration may introduce some decrease in illumination uniformity. Moreover, the spatial overlapping of the beams allows for sets of lasers with identical spectra to be combined. Two or more sets of right or left-eye wavelength sets can be combined to create higher power configurations.

The above description has been particularly described with respect to the case where the projection system operates using a spectral separation technique. That is, the above projection systems utilize a left laser source which emits light with three peaks (one in the red wavelength range, one in the green wavelength range, and one in the blue wavelength range) and a right laser light source which also emits light with three peaks (one in the red wavelength range, one in the green wavelength range, and one in the blue wavelength range), where the peaks in light corresponding to the left eye are spectrally separated from the peaks in light corresponding to the right eye. In other words, the peaks within each wavelength range generated by the left laser light source may be shorter in wavelength than the peaks within each wavelength range generated by the right laser light source, or vice versa. However, the present disclosure is not so limited.

In some examples, the projection systems described herein may operate using a technique other than spectral separation. In one example, the projection systems may operate instead using a polarization separation technique, in which left-eye light is polarized in a first direction and right-eye light is polarized in a second direction perpendicular to the first direction or in which left-eye light is circularly polarized in a clockwise direction and right-eye light is circularly polarized in a counterclockwise direction (or vice versa).

The systems and methods described herein are comparatively simple and, by design, eliminate any double image artifact (i.e., keystone artifacts) resulting from two-projector 2D operation. Moreover, the present disclosure may reduce or eliminate the need for periodic alignment adjustments due to minor mechanical or thermal movements that would be present in comparative example systems.

Systems and devices in accordance with the present disclosure may take any one or more of the following configurations.

(1) A projection system, comprising: a first light source configured to emit a first-eye light, wherein the first-eye light includes a first set of wavelengths; a second light source configured to emit a second-eye light, wherein the second-eye light includes a second set of wavelengths; a first projector including first projection optics configured to receive a first input light; and an optical switch configured to be switched between an a first mode and a second mode, wherein the optical switch is configured to, in the first mode, combine the first-eye light and the second-eye light into a combined light and direct the combined light to the first projection optics as the first input light.

(2) The projection system according to (1), further comprising: a second projector including second projection optics configured to receive a second input light, wherein, the optical switch is configured to, in the second mode, direct the first-eye light to the second projection optics as the second input light.

(3) The projection system according to (2), wherein the second projection optics includes a spatial light modulator configured to perform a spatial modulation on the second input light in response to an image data, thereby to generate a first-eye projection image when the optical switch is in the second mode.

(4) The projection system according to any one of (1) to (3), wherein the optical switch is configured to, in the second mode, direct the second-eye light to the first projection optics as the first input light.

(5) The projection system according to any one of (1) to (4), wherein the optical switch includes a reflective element and a first filter, and when the optical switch is in the first mode: the reflective element is configured to reflect the first-eye light to the first filter as first-eye reflected light, and the first filter is configured to reflect a first portion of the second-eye light, to transmit a second portion of the second-eye light as a first portion of the combined light, and to reflect the first-eye reflected light as a second portion of the combined light.

(6) The projection system according to (5), further comprising: a second projector including second projection optics configured to receive a second input light, wherein, when the optical switch is in the second mode: the reflective element is configured to allow the first-eye light to pass to the second projector.

(7) The projection system according to (6), wherein the second projector includes a second filter configured to, when the optical switch is in the second mode, reflect a first portion of the first-eye light and transmit a second portion of the first-eye light as the second input light.

(8) The projection system according to any one of (1) to (7), wherein the first projection optics includes a spatial light modulator configured to perform a spatial modulation on the first input light in response to an image data, thereby to generate a second-eye projection image when the optical switch is in the second mode and to generate a combined projection image when the optical switch is in the first mode.

(9) The projection system according to any one of (1) to (4), wherein the optical switch includes a first filter and a reflective element, and when the optical switch is in the first mode: the first filter is configured to allow the first-eye light and the second-eye light to pass to the first projection optics as the combined light.

(10) The projection system according to (9), further comprising: a second projector including second projection optics configured to receive a second input light, wherein, when the optical switch is in the second mode: the first filter is configured to reflect the first-eye light and a first portion of the second-eye light to the reflective element as first-eye reflected light, and to transmit a second portion of the second-eye light as the first input light, and the reflective element is configured to direct the first-eye reflected light to the second projector.

(11) The projection system according to (10), wherein the second projector includes a second filter configured to, when the optical switch is in the second mode, reflect a first portion of the first-eye reflected light and transmit a second portion of the first-eye reflected light as the second input light.

(12) The projection system according to any one of (1) to (11), wherein the first light source and the second light source are laser light sources.

(13) A method of image projection comprising: emitting a first-eye light by a first light source, wherein the first-eye light includes a first set of wavelengths; emitting a second-eye light by a second light source, wherein the second-eye light includes a second set of wavelengths; receiving a first input light by a first projector including first projection optics; and switching an optical switch between an a first mode and a second mode, wherein the optical switch is configured to, in the first mode, combine the first-eye light and the second-eye light into a combined light and direct the combined light to the first projection optics as the first input light.

(14) The method according to (13), wherein the optical switch includes a reflective element and a first filter, and switching the optical switch to the first mode comprises: moving the reflective element to a first position, so as to reflect the first-eye light to the first filter as first-eye reflected light, and causing the first filter to reflect a first portion of the second-eye light, to transmit a second portion of the second-eye light as a first portion of the combined light, and to reflect the first-eye reflected light as a second portion of the combined light.

(15) The method according to (14), further comprising: receiving a second input light by a second projector including second projection optics, wherein switching the optical switch to the second mode comprises: moving the reflective element to a second position, so as to allow the first-eye light to pass to the second projector.

(16) The method according to (15), wherein the second projector includes a second filter, the method further comprising: when the optical switch is in the second mode, reflecting, by the second filter, a first portion of the first-eye light and transmitting, by the second filter, a second portion of the first-eye light as the second input light.

(17) The method according to (13), wherein the optical switch includes a first filter and a reflective element, and switching the optical switch to the first mode comprises: moving the first filter to a first position, so as to allow the first-eye light and the second-eye light to pass to the first projection optics as the combined light.

(18) The method according to (17), further comprising: receiving a second input light by a second projector including second projection optics, wherein switching the optical switch to the second mode comprises: moving the first filter to a second position, so as to reflect the first-eye light and a first portion of the second-eye light to the reflective element as first-eye reflected light, and to transmit a second portion of the second-eye light as the first input light, and directing, by the reflective element, the first-eye reflected light to the second projector.

(19) The method according to (18), wherein the second projector includes a second filter, the method further comprising: when the optical switch is in the second mode, reflecting, by the second filter, a first portion of the first-eye reflected light and transmitting, by the second filter, a second portion of the first-eye reflected light as the second input light.

(20) A non-transitory computer-readable medium storing instructions that, when executed by a processor of a projection device, cause the projection device to perform operations comprising the method according to any one of (13) to (19).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A projection system, comprising:
   a first light source configured to emit a first-eye light, wherein the first-eye light includes a first set of wavelengths;
   a second light source configured to emit a second-eye light, wherein the second-eye light includes a second set of wavelengths;
   a first projector including first projection optics configured to receive a first input light; and
   an optical switch configured to be switched between a first mode and a second mode,
   wherein the optical switch is configured to, in the first mode, combine the first-eye light and the second-eye light into a combined light and direct the combined light to the first projection optics as the first input light, wherein
   the optical switch includes a reflective element and a first filter, and
   when the optical switch is in the first mode:
      the reflective element is configured to reflect the first-eye light to the first filter as first-eye reflected light, and
      the first filter is configured to reflect a first portion of the second-eye light, to transmit a second portion of the second-eye light as a first portion of the combined light, and to reflect the first-eye reflected light as a second portion of the combined light.

2. The projection system according to claim 1, further comprising:
a second projector including second projection optics configured to receive a second input light,
wherein the optical switch is configured to, in the second mode, direct the first-eye light to the second projection optics as the second input light.

3. The projection system according to claim 2, wherein the second projection optics includes a spatial light modulator configured to perform a spatial modulation on the second input light in response to an image data, thereby to generate a first-eye projection image when the optical switch is in the second mode.

4. The projection system according to claim 1, wherein the optical switch is configured to, in the second mode, direct the second-eye light to the first projection optics as the first input light.

5. The projection system according to claim 1, further comprising:
a second projector including second projection optics configured to receive a second input light,
wherein, when the optical switch is in the second mode: the reflective element is configured to allow the first-eye light to pass to the second projector.

6. The projection system according to claim 5, wherein the second projector includes a second filter configured to, when the optical switch is in the second mode, reflect a first portion of the first-eye light and transmit a second portion of the first-eye light as the second input light.

7. The projection system according to claim 1, wherein the first projection optics includes a spatial light modulator configured to perform a spatial modulation on the first input light in response to an image data, thereby to generate a second-eye projection image when the optical switch is in the second mode and to generate a combined projection image when the optical switch is in the first mode.

8. The projection system according to claim 1, wherein the first light source and the second light source are laser light sources.

9. A projection system, comprising:
a first light source configured to emit a first-eye light, wherein the first-eye light includes a first set of wavelengths;
a second light source configured to emit a second-eye light, wherein the second-eye light includes a second set of wavelengths;
a first projector including first projection optics configured to receive a first input light;
an optical switch configured to be switched between a first mode and a second mode; and
a second projector including second projection optics configured to receive a second input light,
wherein the optical switch is configured to, in the first mode, combine the first-eye light and the second-eye light into a combined light and direct the combined light to the first projection optics as the first input light,
wherein the optical switch includes a first filter and a reflective element,
wherein, when the optical switch is in the first mode:
the first filter is configured to allow the first-eye light and the second-eye light to pass to the first projection optics as the combined light, and
wherein, when the optical switch is in the second mode:
the first filter is configured to reflect the first-eye light and a first portion of the second-eye light to the reflective element as first-eye reflected light, and to transmit a second portion of the second-eye light as the first input light, and
the reflective element is configured to direct the first-eye reflected light to the second projector.

10. The projection system according to claim 9, wherein the second projector includes a second filter configured to, when the optical switch is in the second mode, reflect a first portion of the first-eye reflected light and transmit a second portion of the first-eye reflected light as the second input light.

11. A method of image projection comprising:
emitting a first-eye light by a first light source, wherein the first-eye light includes a first set of wavelengths;
emitting a second-eye light by a second light source, wherein the second-eye light includes a second set of wavelengths;
receiving a first input light by a first projector including first projection optics; and
switching an optical switch between a first mode and a second mode,
wherein the optical switch is configured to, in the first mode, combine the first-eye light and the second-eye light into a combined light and direct the combined light to the first projection optics as the first input light, wherein
the optical switch includes a reflective element and a first filter, and
switching the optical switch to the first mode comprises:
moving the reflective element to a first position, so as to reflect the first-eye light to the first filter as first-eye reflected light, and
causing the first filter to reflect a first portion of the second-eye light, to transmit a second portion of the second-eye light as a first portion of the combined light, and to reflect the first-eye reflected light as a second portion of the combined light.

12. The method according to claim 11, further comprising:
receiving a second input light by a second projector including second projection optics, wherein
switching the optical switch to the second mode comprises:
moving the reflective element to a second position, so as to allow the first-eye light to pass to the second projector.

13. The method according to claim 12, wherein the second projector includes a second filter, the method further comprising:
when the optical switch is in the second mode, reflecting, by the second filter, a first portion of the first-eye light and transmitting, by the second filter, a second portion of the first-eye light as the second input light.

14. A method of image projection comprising:
emitting a first-eye light by a first light source, wherein the first-eye light includes a first set of wavelengths;
emitting a second-eye light by a second light source, wherein the second-eye light includes a second set of wavelengths;
receiving a first input light by a first projector including first projection optics; and
switching an optical switch between a first mode and a second mode,
wherein the optical switch is configured to, in the first mode, combine the first-eye light and the second-eye light into a combined light and direct the combined light to the first projection optics as the first input light, wherein the optical switch includes a first filter and a reflective element, and switching the optical switch to the first mode comprises:
moving the first filter to a first position, so as to allow the first-eye light and the second-eye light to pass to the first projection optics as the combined light.

15. The method according to claim 14, further comprising:

receiving a second input light by a second projector including second projection optics, wherein switching the optical switch to the second mode comprises:
moving the first filter to a second position, so as to reflect the first-eye light and a first portion of the second-eye light to the reflective element as first-eye reflected light, and to transmit a second portion of the second-eye light as the first input light, and
directing, by the reflective element, the first-eye reflected light to the second projector.

16. The method according to claim 15, wherein the second projector includes a second filter, the method further comprising:

when the optical switch is in the second mode, reflecting, by the second filter, a first portion of the first-eye reflected light and transmitting, by the second filter, a second portion of the first-eye reflected light as the second input light.

17. A non-transitory computer-readable medium storing instructions that, when executed by a processor of a projection device, cause the projection device to perform a set of operations comprising:

controlling a first light source to emit a first-eye light, wherein the first-eye light includes a first set of wavelengths;

controlling a second light source to emit a second-eye light, wherein the second-eye light includes a second set of wavelengths;

controlling a first projector to receive a first input light, the first projector including first projection optics; and controlling an optical switch to switch between a first mode and a second mode, wherein the optical switch, in the first mode, combines the first-eye light and the second-eye light into a combined light and directs the combined light to the first projection optics as the first input light, wherein the optical switch includes a reflective element and a first filter, and controlling the optical switch to switch to the first mode comprises:
controlling the reflective element to move to a first position, so as to reflect the first-eye light to the first filter as first-eye reflected light, and
causing the first filter to reflect a first portion of the second-eye light, to transmit a second portion of the second-eye light as a first portion of the combined light, and to reflect the first-eye reflected light as a second portion of the combined light.

18. A non-transitory computer-readable medium storing instructions that, when executed by a processor of a projection device, cause the projection device to perform a set of operations comprising:

controlling a first light source to emit a first-eye light, wherein the first-eye light includes a first set of wavelengths;

controlling a second light source to emit a second-eye light, wherein the second-eye light includes a second set of wavelengths;

controlling a first projector to receive a first input light, the first projector including first projection optics; and controlling an optical switch to switch between a first mode and a second mode, wherein the optical switch, in the first mode, combines the first-eye light and the second-eye light into a combined light and directs the combined light to the first projection optics as the first input light, wherein the optical switch includes a reflective element and a first filter, and wherein controlling the optical switch to switch to the first mode comprises:
controlling the reflective element to move the first filter to a first position, so as to allow the first-eye light and the second-eye light to pass to the first projection optics as the combined light.

* * * * *

UNITED STATES PATENT AND TRADEMARK OFFICE
CERTIFICATE OF CORRECTION

PATENT NO. : 11,885,975 B2
APPLICATION NO. : 17/608563
DATED : January 30, 2024
INVENTOR(S) : John Frederick Arntsen et al.

It is certified that error appears in the above-identified patent and that said Letters Patent is hereby corrected as shown below:

On the Title Page

Column 2, item (57) Abstract, Line 8, After "between", delete "an".

Signed and Sealed this
Sixth Day of August, 2024

Katherine Kelly Vidal
*Director of the United States Patent and Trademark Office*